United States Patent Office 3,520,312
Patented July 14, 1970

1

3,520,312
FLOW PROCESS INCLUDING VISCOSITY CONTROL
Tracy R. Ackerman, Honeoye Falls, and John F. Schickler, Rochester, N.Y., assignors to General Motors Corporation, Detroit, Mich., a corporation of Delaware
Filed Apr. 19, 1968, Ser. No. 722,653
Int. Cl. F02n 15/00; G05d 11/00
U.S. Cl. 137—4                                    4 Claims

ABSTRACT OF THE DISCLOSURE

A carburetor flow stand is located in an enclosure containing air at substantially constant temperature, pressure, and humidity. Air is drawn from the enclosure through the carburetor, the flow stand chamber, and a plurality of sonic outlet nozzles, the rate of air flow being accurately indicated by the pressure in the flow stand chamber. A calibrated nozzle opening from the enclosure to the flow stand chamber is used to check the accuracy of the measurement of flow stand chamber pressure.

A blending process supplies a continuous stream of test fuel to the carburetor at substantially constant density and viscosity so that the rate of fuel flow may be accurately measured by the pressure drop across an orifice. The blending process includes a step in which the fuel is brought to a substantially constant temperature for accuracy in the viscosity measurement.

SUMMARY OF THE INVENTION

Various factors, among which is the requirement that automotive engine exhaust emissions be carefully regulated, have enhanced a desire to refine carburetor adjusting operations so that the flow curve of an individual carburetor will not vary by more than ± 1½% from a selected flow curve. To achieve such precision in the adjusting operation on a mass production basis, the rates of air flow and fuel flow must be very accurately measured. Since measurement of the air flow rate is dependent upon the temperature, pressure, humidity, and density of the air, and since measurement of the fuel flow rate is dependent upon the temperature, density, and viscosity of the fuel, these variables must be properly monitored to achieve the desired precision.

Air flow is measured in the process depicted herein by drawing air from an enclosure through the carburetor, a flow stand chamber, and a plurality of sonic outlet nozzles. The temperature, pressure, and humidity and thus the density of the air in the enclosure is monitored, and while appropriate correction could be made for variations, in the disclosed process these parameters are held constant. The rate of air flow is then varied only by adjusting the carburetor throttle, and the pressure in the flow stand chamber is measured to determine the rate of air flow.

In prior flow stand operations, only one outlet nozzle was used for each selected flow test point. Such operation requires a large number of nozzles because, while any one carburetor has a limited number of flow test points, variations in specifications for different models of a single carburetor design and a plurality of carburetor designs lead to a large number of carburetor flow test points. Yet operations utilizing a separate nozzle for each flow test point were retained—apparently because it was considered that the conditions of air flow and fuel flow in the flow stand chamber would provide accurate pressure signals only if a single nozzle was in use.

It now has been discovered that, in the above-described process, accurate pressure signals can be obtained with the use of two or more outlet nozzles. The flow stand described herein therefore includes a plurality of outlet nozzles arranged so that the flow area increases from one nozzle to the next in a binary sequence; that is, the second nozzle has twice the area of the first, the third nozzle has twice the area of the second, and so on. These nozzles may be used individually, where the flow area of a particular nozzle meets a test point requirement, or in combinations of two or more. The binary sequence thus allows the greatest range in available flow area with a minimum number of nozzles and with a flow area resolution equal to the area of the smallest nozzle.

It will be appreciated that, in the described process, the accuracy is totally dependent upon the reliability of the sensor (transducer or gauge and related equipment) used to measure the pressure in the flow stand chamber. In order to check on the accuracy of measurement, a calibrated inlet nozzle opens directly from the enclosure into the flow stand chamber. The area of the calibrating nozzle is not variable; therefore, under conditions of constant pressure, temperature, and humidity in said enclosure, the rate of air flow through the calibrating nozzle and the pressure in said chamber will remain constant. The continued accuracy of the sensor may be verified by periodically measuring the pressure in the flow stand chamber while utilizing the calibrated inlet nozzle and comparing the measured pressure with a value previously established as correct.

The process disclosed herein measures the rate of fuel flow through the carburetor by delivering fuel to the carburetor through a supply line at this same rate and measuring the pressure drop across an orifice in the fuel supply line. The rate of fuel flow is significantly affected by variations in fuel viscosity, and a fuel blending system is therefore used to supply fuel at constant viscosity. The blending system combines carburetor test fuel collected from the flow stand during a carburetor flow test with fuel added to replace that lost by evaporation in the flow test process and with blending fuel added to achieve constant viscosity. The combined fuel is delivered to a supply tank which acts as a buffer to smooth slight variations in viscosity, and fuel is delivered from the supply tank to the flow test process.

It is noted that the rate of fuel flow is also affected by variations in fuel density. In this process, the carburetor test fuel is supplied at constant density by supplying the blending fuel and other added fuel at densities equal to the density of the test fuel collected from the flow stand.

The blending system shown herein incorporates an arrangement in which a stream of the combined fuel is brought to a constant temperature for measurement of viscosity. It will be appreciated that temperature control in a fuel stream must be carefully achieved for there is danger of an explosion if the fuel is brought into contact with a substance having a temperature above the flash point. The temperature control arrangement set forth herein avoids this problem by heating the fuel with a non-explosive fluid having a boiling point below the flash point of the fuel.

The details as well as other objects and advantages of this invention are shown in the drawings and disclosed in the description of a preferred embodiment.

DESCRIPTION OF THE PREFERRED EMBODIMENT

Figure 1:
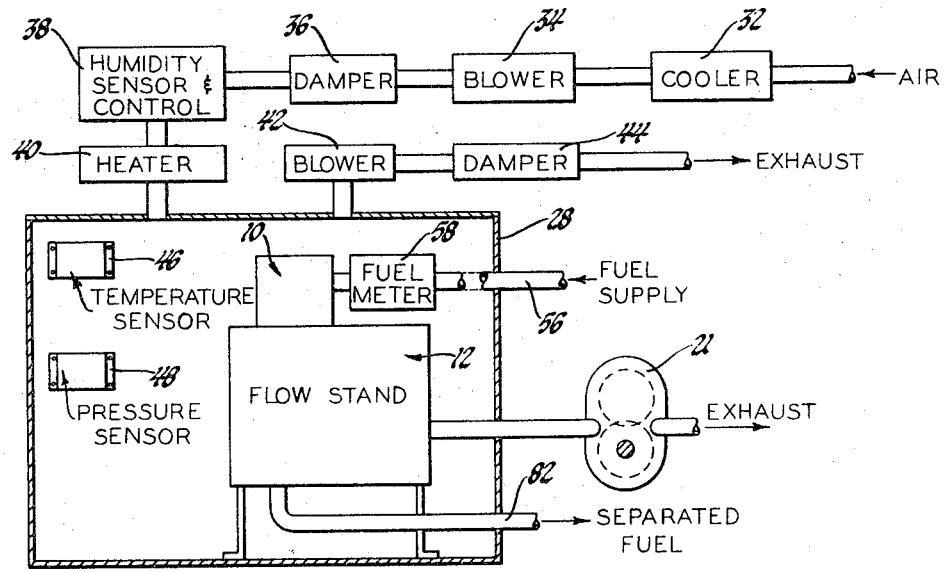
FIG. 1 is a schematic view showing a carburetor flow stand and fuel meter disposed in an enclosure containing air maintained at substantially constant temperature, pressure, and humidity.
Figure 2:
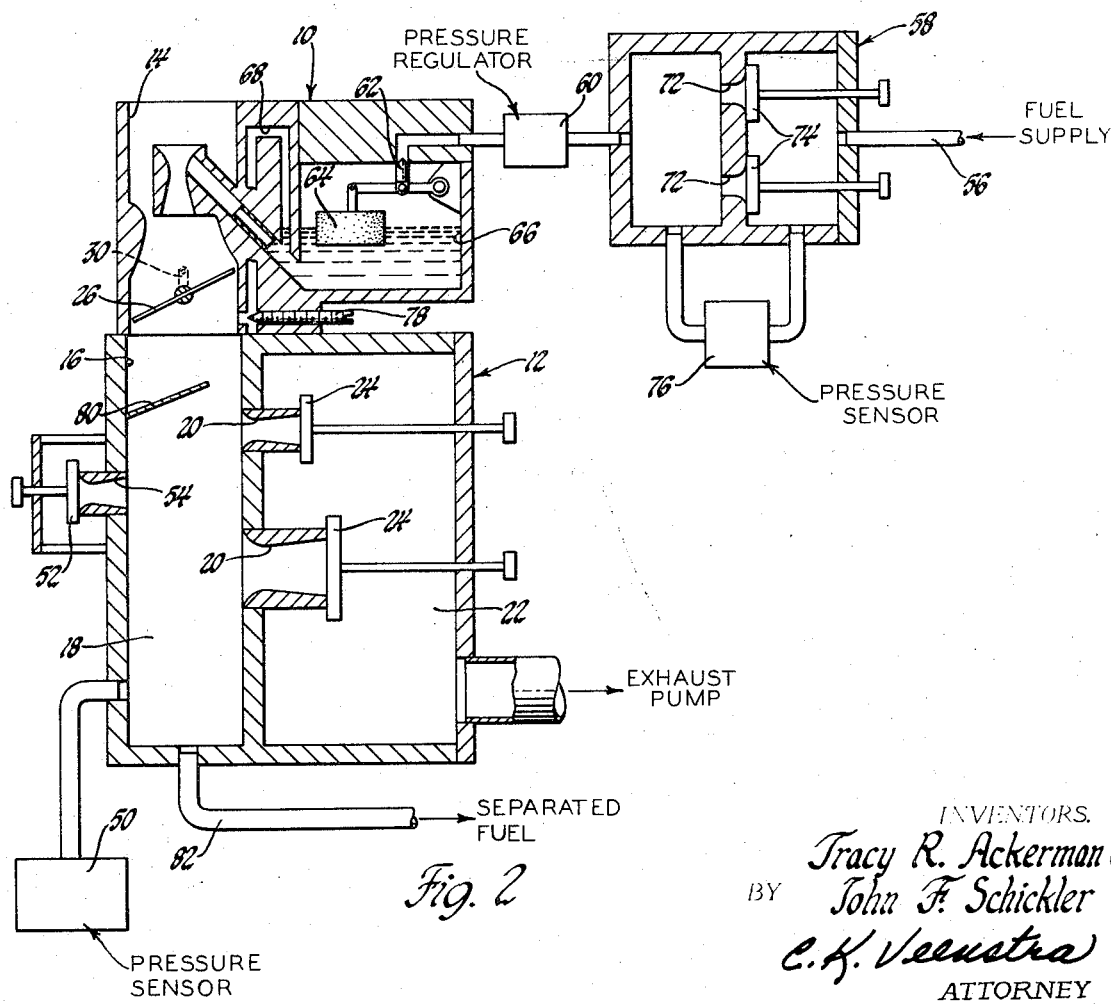
FIG. 2 is a schematic sectional view through the carburetor, the flow stand, and the fuel meter showing the flow paths.

Referring first to FIGS. 1 and 2 of the drawings, a carburetor 10 is mounted on a carburetor flow stand 12, the air flow path 14 of the carburetor being aligned with the inlet 16 of the flow stand chamber 18. In operation, air flow is drawn through the carburetor air flow path 14, the flow stand chamber inlet 16, the flow stand chamber 18, and a plurality of outlet nozzles 20 by an exhaust pump 21. Exhaust pump 21 reduces the pressure in the chamber 22, downstream of outlet nozzles 20, to less than half the pressure in chamber 18 so that the flow through nozzles 20 is maintained at sonic velocities. The flow through each nozzle 20 is therefore not affected by the pressure in chamber 22 and may be approximated by:

$$Q_A = \frac{P_C C A_N}{\sqrt{T_A}} \quad (1)$$

where:

$Q_A$ = the rate of flow through the nozzle
$P_C$ = the pressure in chamber 18
$C$ = the coefficient discharge for the nozzle
$A_N$ = the flow area of the nozzle
$T_A$ = the temperature of the flow through the nozzle It has been found that nine nozzles 20, only two being shown in the drawings for simplification, ranging in size up to about 1⅜ inch in diameter and varying in size according to a binary sequence wherein the smallest nozzle has half the flow area of the next smallest nozzle and so on, provide sufficient flow area to accommodate the highest rate of air flow permitted by carburetor 10. These nozzles 20 are used individually by opening one of the nozzle closure valves 24 or in combination by opening two or more closure valves 24. When more than one closure valve 24 is opened, the total rate of flow from chamber 18 equals the sum of the rates of flow through the open nozzles 20.

The rate of air flow through carburetor air flow path 14 may be approximated by Bernoulli's equation:

$$Q_A{}^2 = 2\rho_A A_T{}^2 (P_A - P_C) \quad (2)$$

where:

$Q_A$ = the rate of air flow
$\rho_A$ = the air density
$A_T$ = the effective flow area provided about the carburetor throttle 26
$P_A$ = the air pressure in the enclosure from which air is supplied to carburetor 10
$P_C$ = the pressure in chamber 18

From Equations 1 and 2 it will be noted that the rate of air flow through carburetor 10 is dependent upon the pressure, temperature, and density of the air supplied to carburetor 10, on the position of carburetor throttle 26, and on the pressure in chamber 18. Referring to the ideal gas law:

$$P_A V_E = \frac{W_A}{M_A} R T_A \quad (3)$$

where:

$P_A$ = the air pressure in the enclosure from which air is supplied to carburetor 10
$V_E$ = the volume of the enclosure
$W_A$ = the total weight of the air in the enclosure
$M_A$ = the molecular weight of the air in the enclosure
$R$ = a constant
$T_A$ = the enclosure air temperature the density may be expressed by:

$$\rho_A = \frac{W_A}{V_E} = \frac{M_A P_A}{R T_A} \quad (4)$$

From this it is recognized that the density is dependent upon pressure and temperature and also upon the molecular weight. Here, the molecular weight must account for variations in the humidity of the air.

It is recognized that these various parameters could be measured at each carburetor flow test point and a complex equation solved to determine the rate of air flow through carburetor air flow path 14. It has been found preferable, however, to provide an enclosure 28 in which air is contained at constant temperature, pressure, and humidity and thus at constant density. From Equation 1 it can be seen that the rate of air flow will then be dependent solely upon the pressure in chamber 18. From Equation 2 it will be noted that the pressure in chamber 18 varies with the position of throttle 26.

To obtain a desired rate of air flow, then, selected outlet nozzle closure valves 24 are opened, the pressure in chamber 18 is measured, and the position of throttle 26 is adjusted by a throttle control lever 30 to obtain the pressure in chamber 18 corresponding to the desired rate of air flow.

FIG. 1 illustrates schematically the means by which the temperature, pressure, and humidity in enclosure 28 are kept constant. Air is drawn in through an air-conditioning unit or cooler 32 by blower 34. The air flow produced by blower 34 is controlled by the blower speed and by a damper 36. The humidity of the air flow from lower 34 is measured and controlled by a unit 38 to maintain the humidity of the air at a substantially constant level. The air flow to enclosure 28 is then heated to a substantially constant temperature in a unit 40. Air exhausted from enclosure 28 by a blower 42, the flow through which is controlled by its speed and by a damper 44. The air flow produced by blowers 34 and 42 is controlled to maintain a substantially constant pressure in enclosure 28. The temperature and pressure in enclosure 28 are measured by sensors 46 and 48 respectively.

Referring again to FIG. 2, the pressure in chamber 18 is measured by a sensor 50. Inasmuch as the measurement of air flow through carburetor air flow path 14 is totally dependent upon the measurement of pressure in chamber 18, pressure sensor 50 must provide a reliable indication of the pressure in chamber 18. To provide a periodic check on the accuracy of the measurement, carburetor 10 is removed from flow stand 12 and flow stand chamber inlet 16 is blocked by a plate. One of the closure valves 24 is opened to permit air flow through a nozzle 20. A closure valve 52 is then opened to permit air flow directly from enclosure 28 into flow stand chamber 18 through a calibrated inlet nozzle 54. Unlike the carburetor flow area, the flow area of nozzle 54 is not variable, and from Equations 1 and 2 it can be seen that a certain pressure will be obtained in chamber 18. The pressure indicated by pressure sensor 50 may be compared with a pressure value previously established as correctly indicating the rate of air flow through inlet nozzle 54 to verify the accuracy and reliability of pressure sensor 50.

Fuel is supplied through a supply line 56, a fuel meter 58, and a pressure regulator 60 to the carburetor fuel inlet 62. A conventional float and inlet valve mechanism 64 maintains fuel in the carburetor fuel bowl 66 at a substantially constant level whereby fuel flow through inlet 62 equals the rate at which fuel is discharged through the carburetor fuel passages such as passage 68. Fuel meter 58 contains a plurality of metering orifices 72 of various sizes each controlled by a closure valve 74. The rate of fuel flow from supply line 56 to carburetor 10 may be measured by one of orifices 72 according to the Bernoulli equation:

$$Q_F{}^2 = 2\rho_F A_0{}^2 \Delta P \quad (5)$$

where:

$Q_F$ = the rate of fuel flow through the orifice
$\rho_F$ = the fuel density $A_o$ = the area of the orifice
$\Delta P$ = the pressure differential across the orifice A pressure sensor 76 measures the pressure drop across orifices 72 to measure the fuel flow rate. To assure accuracy of measurement, the pressure differential is maintained within a narrow range by selecting a small orifice 72 for low flow rates and a large orifice 72 for high flow rates.

In operation, carburetor 10 is located over flow stand chamber inlet 16 and exhaust pump 21 draws air from enclosure 28 through carburetor air flow path 14, flow stand chamber inlet 16, flow stand chamber 18, and selected sonic outlet nozzles 20. The pressure in chamber 18 is measured by pressure sensor 50 and the position of throttle 26 is adjusted to vary the carburetor flow area and achieve a selected pressure in chamber 18 indicative of a predetermined rate of air flow. One of the fuel metering orifice closure valves 74 is opened to permit fuel flow to the carburetor fuel inlet 62, and the pressure drop across the corresponding fuel metering orifice 72 is measured by pressure sensor 76. The position of fuel flow control valve 78 is then adjusted to achieve the desired rate of fuel flow through fuel passage 68 corresponding to the predetermined rate of air flow. These steps are repeated for each carburetor flow test point such as part throttle or off idle, other appropriate adjustments being made to the carburetor for these test points.

It is contemplated that most of the aforementioned operations be performed automatically under control of a process computer. In such an arrangement, the computer automatically checks each flow test point for a particular carburetor. At each test point, the computer selects the appropriate flow stand outlet nozzles 20 and fuel metering orifices 72 and, through solenoids, opens the corresponding closure valves 24 and 74. The pressure sensor 50 provides an output voltage indicative of the pressure in chamber 18; this output voltage is compared with a reference voltage supplied by the computer, the differential being amplified and utilized to operate a motor which positions throttle 26. Pressure sensor 76 provides an analog signal indicative of the rate of fuel flow; in response the computer provides a digital output to stepping motors which position the various carburetor adjustments such as control valve 78. The details for accomplishing automatic operation are well-known to those familiar with process computer operation and need not be set forth at greater length.

A baffle 80 is positioned in flow stand chamber 18 to separate large droplets of fuel discharged by carburetor 10 before passage through sonic outlet nozzles 20. The separated fuel is discharged from chamber 18 through a line 82.

The relationship attributed to Poiseuille:

$$\Delta P = Q_F \mu_f \frac{8L}{\pi R^4} \quad (6)$$

where:

$\Delta P$ = the pressure differential
$Q_F$ = the rate of fuel flow
$\mu_f$ = the fuel viscosity
L = the length of the flow path
R = the radius of the flow path indicates that at a certain rate of fuel flow, the measured pressure differential is dependent upon the fuel viscosity. Shepard's equation:

$$\log \mu_f = \frac{A}{T_F} + B \quad (7)$$

where:

$\mu_f$ = the fuel viscosity
$T_F$ = the fuel temperature
A and B = constants provides an approximation for indicating the change in fuel viscosity with changes in fuel temperature. In FIG. 1, however, it is noted that fuel supply line 56 has a very long flow path through enclosure 28. Since enclosure 28 is maintained at constant temperature, the fuel in supply line 56 is brought to a constant temperature before it reaches fuel meter 58 and the fuel pressure differential is therefore measured at a constant temperature.

Figure 3:
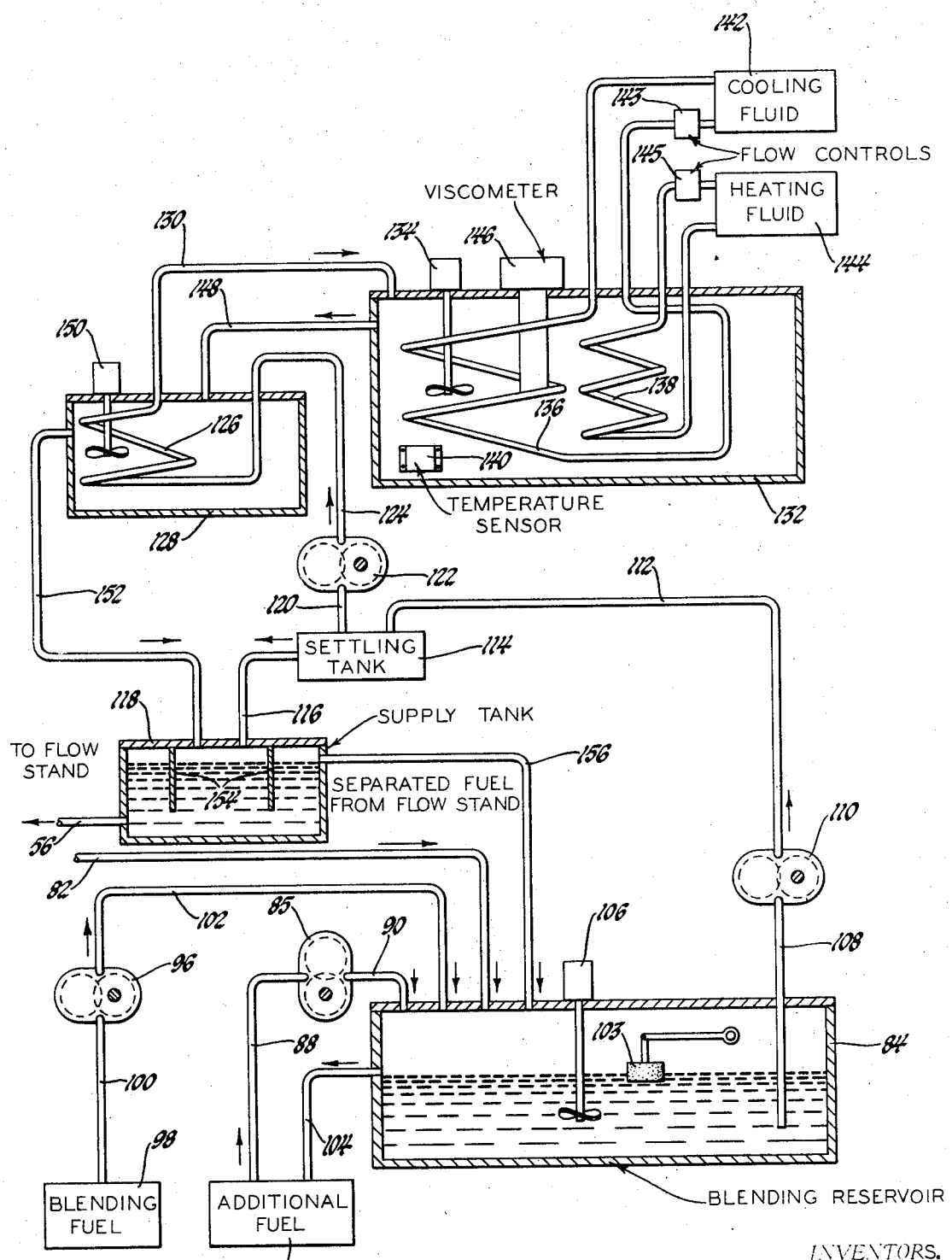
FIG. 3 is a schematic view of the components used in the viscosity control process.

However, the viscosity of the fuel discharged from flow stand chamber 18 through line 82 displays an increase of about 2% over the viscosity of the fuel delivered through supply line 56. This increase in viscosity can cause a variation in the rate of idle fuel flow of up to 1%. To achieve the necessary accuracy in measurement of the rate of fuel flow with pressure sensor 76, therefore, the fuel cannot be recirculated directly from line 82 to supply line 56. A fuel blending arrangement for providing a continuous flow of fuel at constant viscosity to supply line 56 is shown in FIG. 3. In the following description of FIG. 3 various flow parameters and container dimensions are given for the sole purpose of illustrating an operative embodiment of the system.

Fuel separated during the carburetor flow process is returned through line 82 at a rate of about 6 gallons per minute and at a viscosity of about 1.02 cp. (All viscosity values are given at 68° F.) The separated fuel is used as the primary source of fuel and is discharged into one end of a 400 gallon blending reservoir 84. A pump 85 supplies additional fuel to blending reservoir 84 from a tank 86 through lines 88 and 90. The additional fuel is pumped at a rate of about 25 gallons per minute and has a viscosity in the range from about 1.005 cp. to 1.041 cp. A pump 96 supplies blending fuel to blending reservoir 84 from a tank 98 through lines 100 and 102. The blending fuel is pumped at a rate of about 18 gallons per minute and has a viscosity in the range from 0.921 cp. to 0.979 cp.

A float mechanism 103 controls the operation of pump 85 to maintain a fuel depth in blending reservoir 84 between 15 and 16 inches whereby a substantially constant volume of about 200 gallons of fuel is maintained in blending reservoir 84 for blending. Pump 85 does not operate when pump 96 is operating. Any excess fuel in blending reservoir 84 is spilled through an overflow line 104 back to tank 86.

The separated fuel, the additional fuel, and the blending fuel are mixed in blending reservoir 84 by a mixer 106 to obtain a blended fuel. The blended fuel has a viscosity representing an average of the viscosities of the separated fuel, the additional fuel, and the blending fuel in accordance with the following:

$$\log \mu_{mix} = \sum_{i=1}^{N} X_i \log \mu_i \quad (8)$$

where:

$\mu_{mix}$ = the viscosity of the blended fuel mixture
N = the number of sources of fuel at different viscosity
$X_i$ = the mole fraction of the fuel from one source in the blended mixture
$\mu_i$ = the viscosity of the fuel from that source Fuel is withdrawn from the opposite end of blending reservoir 84 through a line 108 by a pump 110 and is delivered at a rate of about 20 gallons per minute through a line 112 into a settling tank 114 containing about 25 gallons of fuel at a depth of about six inches. Any air entrained in the fuel during the blending process separates in settling tank 114, and fuel is discharged from settling tank 114 through a line 116 to a 350 gallon supply tank 118.

The viscosity of fuel delivered from blending reservoir 84 to supply tank 118 is measured by withdrawing a stream of fuel from settling tank 114 through a line 120 at a rate of about 1 gallon per minute. A pump 122 delivers this fuel stream through a line 124, a heat exchange coil 126 in a preconditioner tank 128, and a line 130 to a five gallon main tank 132 at temperatures ranging between 60° F. and 90° F.

A mixer 134 in main tank 132 conveys the fuel in heat exchange relationship with a cooling coil 136 and a heating coil 138. A temperature sensor 140 measures the fuel temperature in main tank 132; the flow of cooling fluid from a source 142 through coil 136 is regulated by a flow control unit 143 and the flow of heating fluid from a source 144 through coil 138 is regulated by a flow control unit 145 to maintain a controlled temperature of 70.0±0.2° F. in tank 132.

It is important that the fuel, which has a flash point of slightly over 100° F., not be exposed to a temperature in excess of about 98° F. Therefore, Du Pont Freon TMC solvent, which has a boiling point of 97.7° F., is used as the heating fluid. Since this solvent is non-explosive, it is safe for use in this application and can be heated in a bath containing an electrical heater. The low boiling point of this solvent assures that the fuel will not be heated above its flash point.

Viscosity readings of the fuel in main tank 132 are taken once each minute by a viscometer 146. If the viscosity is above the controlled viscosity desired for delivery through supply line 56, pump 96 is actuated to deliver blending fuel to blending reservoir 84 for 15 seconds.

Fuel is discharged from main tank 132 through an overflow line 148 into the three gallon preconditioner tank 128. A mixer 150 is preconditioner tank 128 conveys the fuel in heat exchange relationship with coil 126 to bring the fuel delivered through coil 126 to main tank 132 closer to the desired 70° temperature. Fuel overflows from preconditioner tank 128 through a line 152 to supply tank 118.

Fuel is discharged, at a rate of about 20 gallons per minute, into supply tank 118 near the center and is withdrawn through supply line 56 from one end of tank 118 at a rate of about 12 gallons per minute. Tank 118, containing baffles 154, acts as a buffer in which slight variations in the viscosity of the fuel discharged into tank 118 are averaged. The fuel is then withdrawn through supply line 56 from tank 118 at a controlled viscosity of 0.997±0.0025 cp.

Excess fuel is drained from supply tank 118 through an overflow line 156 and is discharged into blending reservoir 84 for mixture with the blended fuel therein. The controlled viscosity of the excess fuel drained from supply tank 118 is averaged with the viscosity of the fuel in blending reservoir 84 and reduces fluctuations in viscosity in blending reservoir 84.

It should be noted from Equation 5 that measurement of the rate of fuel flow is also dependent upon the fuel density. However, the density of the separated fuel discharged through line 82 does not display any significant change from the density of the fuel delivered through supply line 56. To maintain fuel density constant, therefore, the fuel supplied from tanks 86 and 98 is supplied at a density equal to the density of the separated fuel.

The foregoing process achieves the objective of accurate measurement of air and fuel flow by controlling variations in air and fuel flow parameters within very narrow limits, the fuel temperature, density, and viscosity, for example, being controlled within ±0.25%. This accuracy demonstrates the advantages of the process.

We claim:
1. The process of establishing a continuous stream of supply liquid having a substantially constant controlled viscosity, said process comprising the steps of:
   delivering a stream of source liquid into a blending reservoir, said source liquid having an inherent viscosity range,
   delivering a stream of additional liquid into said blending reservoir, said additional liquid having a viscosity range intermediate the viscosity range of the source liquid and the controlled viscosity of the supply liquid,
   controlling the delivery of additional liquid into said blending reservoir to maintain therein a substantially constant volume of liquid for blending,
   delivering a stream of blending liquid into said blending reservoir, said blending liquid having a viscosity range which may be averaged with the viscosity ranges of the source liquid and the additional liquid to obtain the controlled viscosity of the supply liquid,
   blending the source liquid, the additional liquid, and the blending liquid in said blending reservoir to obtain a blended liquid having a viscosity representing an average of the viscosity ranges of the source liquid, the additional liquid, and the blending liquid,
   withdrawing a stream of liquid from said blending reservoir,
   measuring the viscosity of the liquid withdrawn from said blending reservoir,
   controlling the delivery of blending liquid into said blending reservoir to cause the measured viscosity of the liquid withdrawn from said blending reservoir to approach the controlled viscosity of the supply liquid,
   delivering a stream of liquid from said blending reservoir to a supply tank, said supply tank providing a buffer in which momentary variations in the viscosity of the liquid delivered from said blending reservoir are averaged and a substantially constant controlled viscosity is established, and
   withdrawing from said supply tank a continuous stream of supply liquid having a substantially constant controlled viscosity.

2. The process of claim 1 which further comprises the steps of:
   draining excess liquid from said supply tank, said excess liquid having a viscosity closely approximating the substantially constant controlled viscosity of the supply liquid,
   returning the excess liquid drained from said supply tank to said blending reservoir, and
   blending the excess liquid with the blended liquid in said blending reservoir to average the viscosity of the excess liquid with the viscosity of the blended liquid and diminishes variations in the viscosity of the liqud withdrawn from said blending reservoir.

3. The process of claim 1 wherein the step of measuring the viscosity of the liquid withdrawn from said blending reservoir includes:
   delivering the liquid withdrawn from said blending reservoir successively through a heat exchange path in a pre-conditioner tank and into a main tank wherein the liquid may achieve a substantially constant temperature,
   returning liquid from said main tank to said pre-conditioner tank,
   conveying liquid returned from said main tank in heat exchange relationship with said heat exchange path in said preconditioner tank whereby the temperature of the liquid withdrawn from said blending reservoir and delivered to said main tank approaches the substantially constant controlled temperature of the liquid in said main tank,
   delivering warming fluid through a heat exchange path in said main tank, the warming fluid having a temperature greater than the temperature of the liquid withdrawn from said blending reservoir and delivered to said main tank,
   delivering cooling fluid through a heat exchange path in said main tank, the cooling fluid having a temperature less than the temperature of the liquid withdrawn from said blending reservoir and delivered to said main tank,
   conveying the liquid delivered to said main tank in heat exchange relationship with said heat exchange paths in said main tank, measuring the temperature of the liquid in said main tank, controlling the delivery of warming fluid and cooling fluid through said heat exchange paths in said main tank to maintain the measured temperature of the liquid in said main tank substantially constant, and measuring the viscosity of the liquid in said main tank at a substantially constant temperature.

4. The process of flowing a carburetor having a fuel inlet and a fuel passage for delivering liquid from said fuel inlet, said process comprising the steps of claim 3 and further comprising the steps of:

delivering the streams of additional liquid and blending liquid to said blending reservoir at densities substantially equal to the density of the stream of source liquid delivered to said blending reservoir whereby the density of the liquid delivered to and withdrawn from said supply tank is substantially constant, delivering the supply liquid withdrawn from said supply tank through a supply line, controlling the tempertaure of said supply line whereby delivery of supply liquid from the outlet of said supply line occurs at substantially constant temperature and thus at substantially constant viscosity, delivering supply liquid from said supply line outlet to said carburetor fuel inlet, controlling the delivery of supply liquid to said carburetor fuel inlet whereby supply liquid is delivered to said fuel inlet at a rate equal to the rate at which liquid is delivered through said carburetor fuel passage, and providing orifice means in said supply line outlet whereby all supply liquid delivered to said carburetor fuel inlet passes through said orifice means at substantially constant viscosity and density, said orifice means having a certain area available for liquid flow therethrough whereby the rate of liquid flow through said carburetor fuel passage is indicated by the difference in the pressures on opposite sides of said orifice means.

References Cited
UNITED STATES PATENTS 3,025,232   3/1962   Jones _____ 137—4 X ALAN COHAN, Primary Examiner U.S. Cl. X.R.

137—92